United States Patent
Ishida

(10) Patent No.: US 7,802,647 B2
(45) Date of Patent: Sep. 28, 2010

(54) MOTORCYCLE INCLUDING BELT TYPE CONTINUOUSLY VARIABLE TRANSMISSION HAVING RESIN BLOCK BELT

(75) Inventor: Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 308 days.

(21) Appl. No.: 12/018,006

(22) Filed: Jan. 22, 2008

(65) Prior Publication Data
US 2008/0308337 A1 Dec. 18, 2008

(30) Foreign Application Priority Data
Jan. 26, 2007 (JP) ................ 2007-016489

(51) Int. Cl.
B60K 11/06 (2006.01)
(52) U.S. Cl. ............ 180/230; 180/68.1; 474/93
(58) Field of Classification Search ............ 180/219, 180/230, 227, 229, 68.1, 908; 474/90, 93, 474/146, 91; 74/606 A
See application file for complete search history.

(56) References Cited

U.S. PATENT DOCUMENTS

| | | | | |
|---|---|---|---|---|
| 2,315,317 A | * | 3/1943 | Copp et al. | ............ 474/93 |
| 4,531,928 A | * | 7/1985 | Ikenoya | ............ 474/93 |
| 4,708,699 A | * | 11/1987 | Takano et al. | ............ 474/144 |
| 4,733,639 A | * | 3/1988 | Kohyama et al. | ............ 123/198 E |
| 5,152,361 A | * | 10/1992 | Hasegawa et al. | ............ 180/230 |
| 5,976,044 A | * | 11/1999 | Kuyama | ............ 474/93 |
| 7,059,438 B1 | | 6/2006 | Sheets | |
| 2003/0087716 A1 | * | 5/2003 | Tsuji et al. | ............ 474/242 |
| 2006/0049623 A1 | * | 3/2006 | Karube et al. | ............ 280/833 |

FOREIGN PATENT DOCUMENTS

| | | |
|---|---|---|
| JP | 2002-147582 | 5/2002 |
| JP | 2002130440 A | 5/2002 |
| JP | 2002147582 A | 5/2002 |

OTHER PUBLICATIONS

European search report for corresponding European application No. 08250291.5 lists the references above.

* cited by examiner

*Primary Examiner*—Anne Marie M Boehler
(74) *Attorney, Agent, or Firm*—Keating & Bennett, LLP

(57) ABSTRACT

A noise preventing means for a motorcycle including a belt type continuously variable transmission using a resin block belt. An end of an intake duct for inducting cooling air into a belt chamber inside a transmission casing is connected to a front half part of the transmission casing. The intake duct extends upward from the transmission casing, then curves rearward, and extends rearward passing over a seat pillar. An air chamber is connected to a rear end of the intake duct. The intake duct has a curving part curving around the seat pillar.

14 Claims, 15 Drawing Sheets

(a)

(b)

(a)

(b)

(a)

(b)

(a)

(b)

(a)

(b)

(a)

(b)

(a)

(b)

MOTORCYCLE INCLUDING BELT TYPE CONTINUOUSLY VARIABLE TRANSMISSION HAVING RESIN BLOCK BELT

RELATED APPLICATIONS

This application claims the benefit of priority under 35 USC 119 of Japanese patent application no. 2007-016489, filed on Jan. 26, 2007, which application is hereby incorporated by reference in its entirety.

BACKGROUND OF THE INVENTION

1. Field of the Invention

The present invention relates to a motorcycle including a belt type continuously variable transmission having a resin block belt.

2. Description of Related Art

A motorcycle including a belt type continuously variable transmission is known in the art (for example, see JP-A-2002-147582). A belt type continuously variable transmission includes a V-belt wound around primary and secondary sheaves. A driving force of a crankshaft of an engine is transmitted in the order of the primary sheave, the V-belt, and the secondary sheave. The driving force is transmitted to a driving wheel after a speed is changed. The primary sheave, V-belt, and secondary sheave are housed in a belt chamber formed inside the transmission casing.

In JP-A-2002-147582, a resin block belt is used to improve durability of the V-belt and prevent heat generation due to deformation. The resin block belt includes a large number of resin blocks coupled together by coupling members. However, because the resin blocks are separated from each other, they tend to collide with each other while the V-belt is running. Therefore, a resin block belt tends to cause more noise than a rubber belt.

In consideration of this problem, JP-A-2002-147582 suggests disposing a sound absorption material on an inner surface of the transmission casing accommodating the resin block belt to prevent noise. However, the V-belt runs at a high speed, and the primary and secondary sheaves rotate at high speeds. Therefore, the sound absorption material must not contact the V-belt and sheaves and must be disposed a certain distance away from the V-belt and sheaves. Therefore, if the sound absorption material is disposed on the inner surface of the transmission casing as in JP-A-2002-147582, a space for the sound absorption material must be provided inside the transmission casing. However, the belt chamber volume is increased if extra space for the sound absorption material is provided. Therefore, the motorcycle of JP-A-2002-147582 has a problem that the belt type continuously variable transmission is increased in size.

A sound absorption material normally also has a thermal insulation function. Therefore, a temperature inside the belt chamber is apt to rise when sound absorption material is provided on the inner surface of the transmission casing. Thus, there is a problem that the durability of the resin block belt is decreased due to a temperature increase in the belt chamber.

SUMMARY OF THE INVENTION

The present invention is made in consideration of the foregoing problem and provides a noise preventing means for a motorcycle having a belt type continuously variable transmission with a resin block belt.

The inventors determined after careful research that noise produced in a belt type continuously variable transmission having a resin block belt is mostly pitch noise caused due to motions of the resin blocks running one after another. The pitch noise is a high frequency sound generally having characteristics of high linearity and weak transmission. The inventors then examined the relationship between an air passage for cooling the belt chamber and reduction of high frequency sounds, and made the invention described hereinafter.

Accordingly, the present invention is directed to a motorcycle including an engine unit having a transmission casing in which a belt chamber is formed, and a belt type continuously variable transmission housed in the belt chamber and having a resin block belt. A frame member is disposed more rearward than or above the transmission casing, extends in a vertical direction or obliquely upward and downward directions, and supports at least a part of the engine unit. An air passage is connected to the transmission casing and has an intake passage for inducting air into the belt chamber or an exhaust passage for discharging air from the belt chamber. The air passage extends rearward from the transmission casing and passes over the frame member in a side view, and has a curving part curving around the frame member.

The air passage of the motorcycle extends rearward from the transmission casing passing over the frame member, and is a long air passage. Therefore, noise of the belt type continuously variable transmission occurring in the belt chamber is damped inside the air passage before it reaches outside. Consequently, noise released outside from the air passage is minimized. The air passage has a curving part curving around the frame member. Thereby, an interruption between the air passage and the frame member is prevented, and linear travel of a high frequency sound is prevented. Accordingly, the motorcycle effectively prevents high frequency sound that is a major cause of noise. The motorcycle thereby effectively prevents noise caused by the resin block belt.

The present invention provides a noise preventing means suitable for a motorcycle including a belt type continuously variable transmission having a resin block belt.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 6(*b*) is a side view of the resin block belt.

DETAILED DESCRIPTION OF THE INVENTION

Embodiments of the present invention are now described in detail with reference to drawings.

First Embodiment

General Construction of Motorcycle 1

Figure 1:
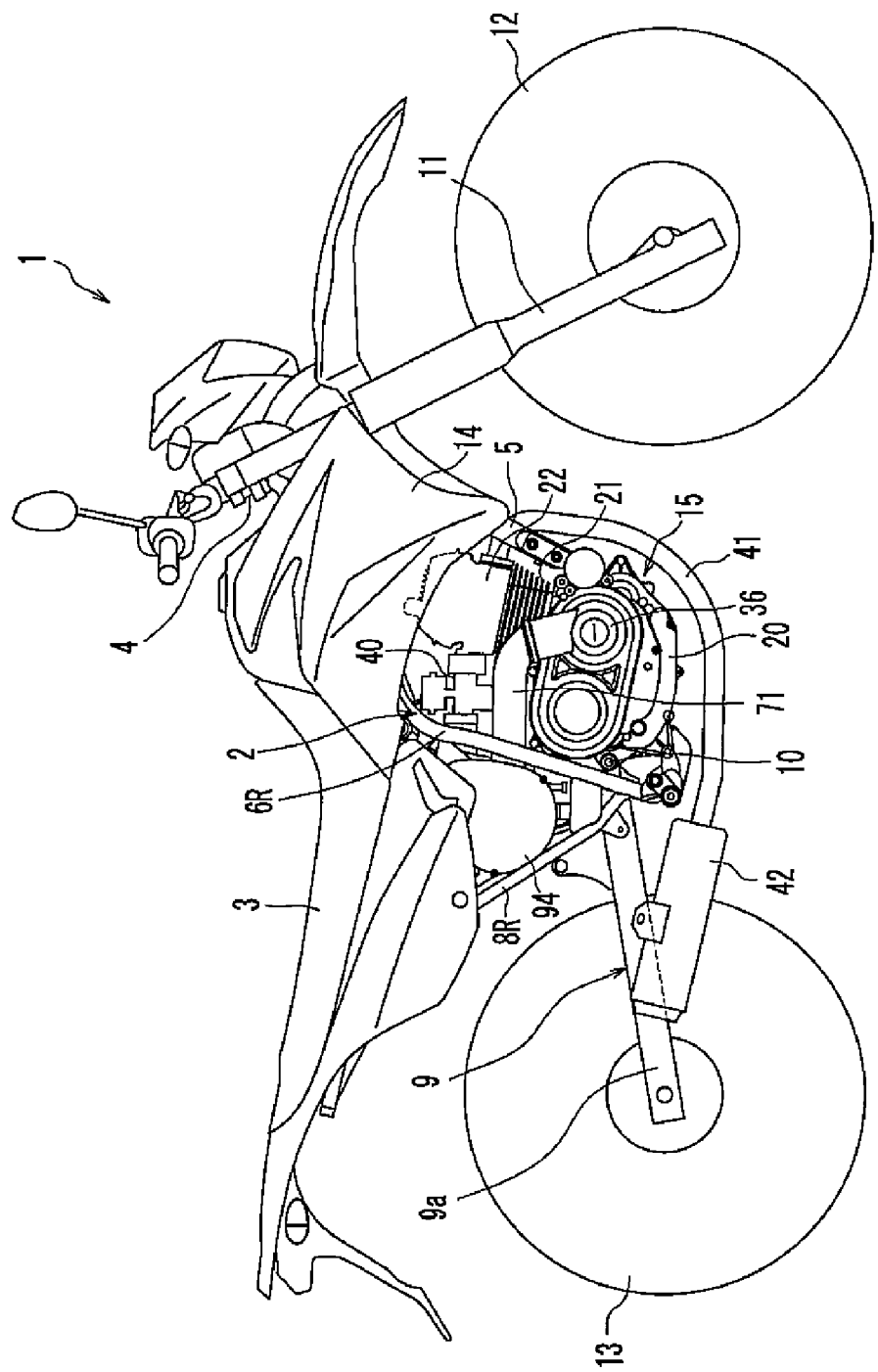
FIG. 1 is a side view of a motorcycle according to a first embodiment of the invention.

As shown in FIG. 1, a straddle type vehicle according to this embodiment is a motorcycle 1. Motorcycle 1 includes a body frame 2 and a seat 3 on which a driver sits. In one embodiment, motorcycle 1 is an off-road type motorcycle. However, motorcycle 1 may another type such as on-road type, scooter type or moped type. In the following description, front, rear, right and left are directions from the perspective of a driver sitting on seat 3.

—Construction of Body Frame 2 and Parts Around Body Frame 2—

Figure 2:
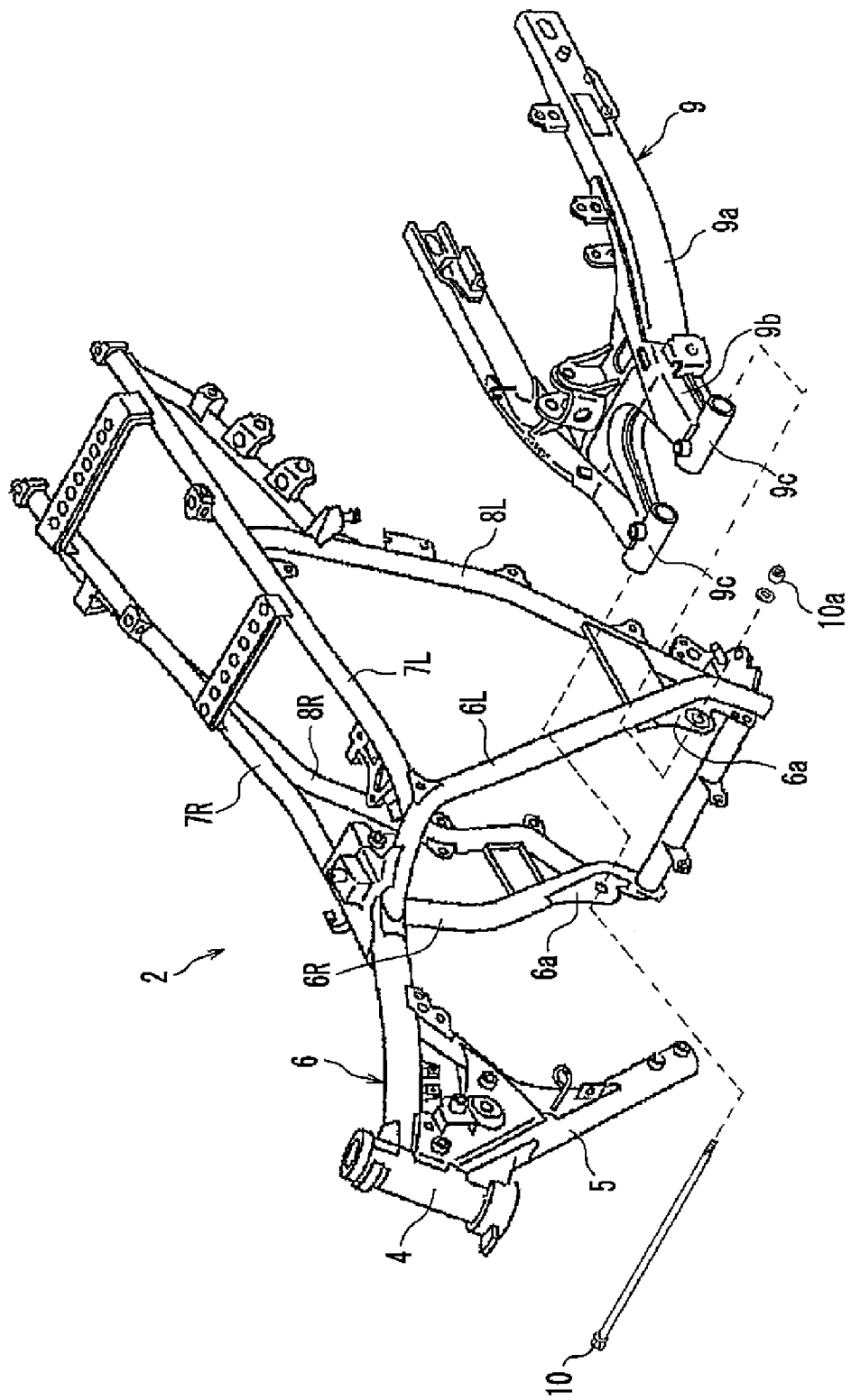
FIG. 2 is a perspective view of a body frame of the motorcycle.

As shown in FIG. 2, which is a perspective view of body frame 2, body frame 2 includes a head pipe 4, a down tube 5 extending downward from head pipe 4, and a main tube 6 extending rearward from head pipe 4 above down tube 5. A midway part of main tube 6 bifurcates into a left seat pillar 6L extending leftward and a right seat pillar 6R extending rightward. Seat pillars 6L and 6R have a generally transversely symmetrical shape, curve in the rear of the bifurcating part, and extend downward.

Seat rails 7L and 7R extend rearward from the curving parts of seat pillars 6L and 6R. Rear ends of backstays 8L and 8R are connected to seat rails 7L and 7R. Front ends of backstays 8L and 8R are connected to bottom ends of seat pillars 6L and 6R. Pivot parts 6a into which a pivot shaft 10 is inserted are provided at bottom ends of seat pillars 6L and 6R. A rear arm 9 is coupled to pivot parts Ga.

Rear arm 9 includes a generally U-shaped arm part 9a opened rearward, and a generally U-shaped coupling part 9b opened forward. A pipe 9c is provided on each end of right and left branches of coupling part 9b. Pivot shaft 10 passes through pivot parts 6a and pipes 9c. Thereby, rear arm 9 is swingably coupled to bottom ends of seat pillars 6L and 6R via pivot shaft 10. In this embodiment, pivot shaft 10 is formed with a long bolt, and a left end of pivot shaft 10 is fixed by a nut 10a.

A front fork 11 is inserted into head pipe 4. As shown in FIG. 1, a front wheel 12 is supported by front fork 11. A rear wheel 13 is supported by a bottom part of arm part 9a of rear arm 9. A cover 14 is disposed above body frame 2. Seat 3 is disposed slightly rearward of a center of cover 14.

Figure 3:
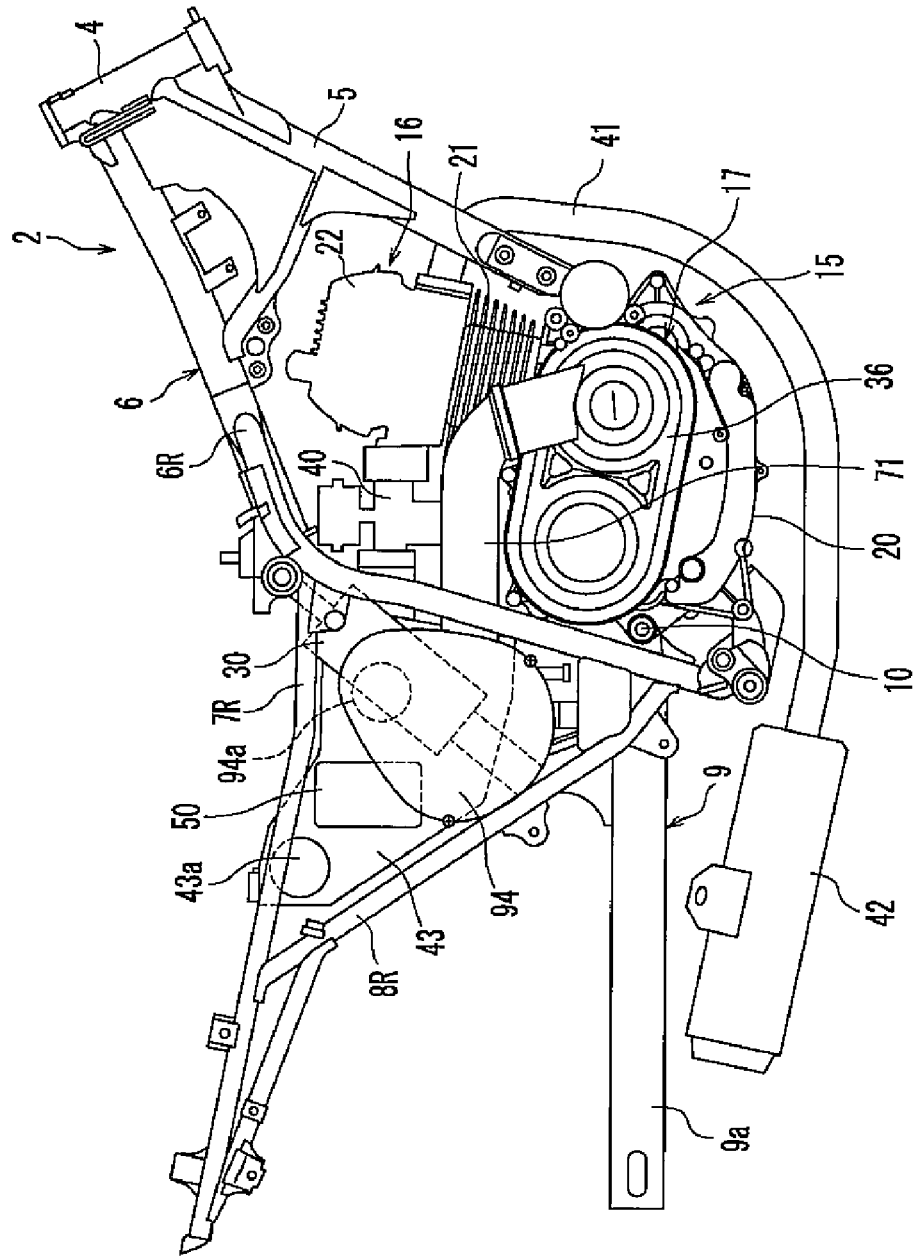
FIG. 3 is a right side view of a part of the motorcycle.

As shown in FIG. 3, which is a right side view of a part of motorcycle 1, an engine unit 15 for driving rear wheel 13 is suspended on body frame 2 and is fixed to down tube 5 and seat pillars 6L and 6R. Engine unit 15 includes an engine 16 and a belt type continuously variable transmission (CVT) 17. Engine 16 includes a crankcase 20, a cylinder 21 and a cylinder head 22. CVT 17 is housed in a transmission casing 36 connected to crankcase 20.

Figure 4:
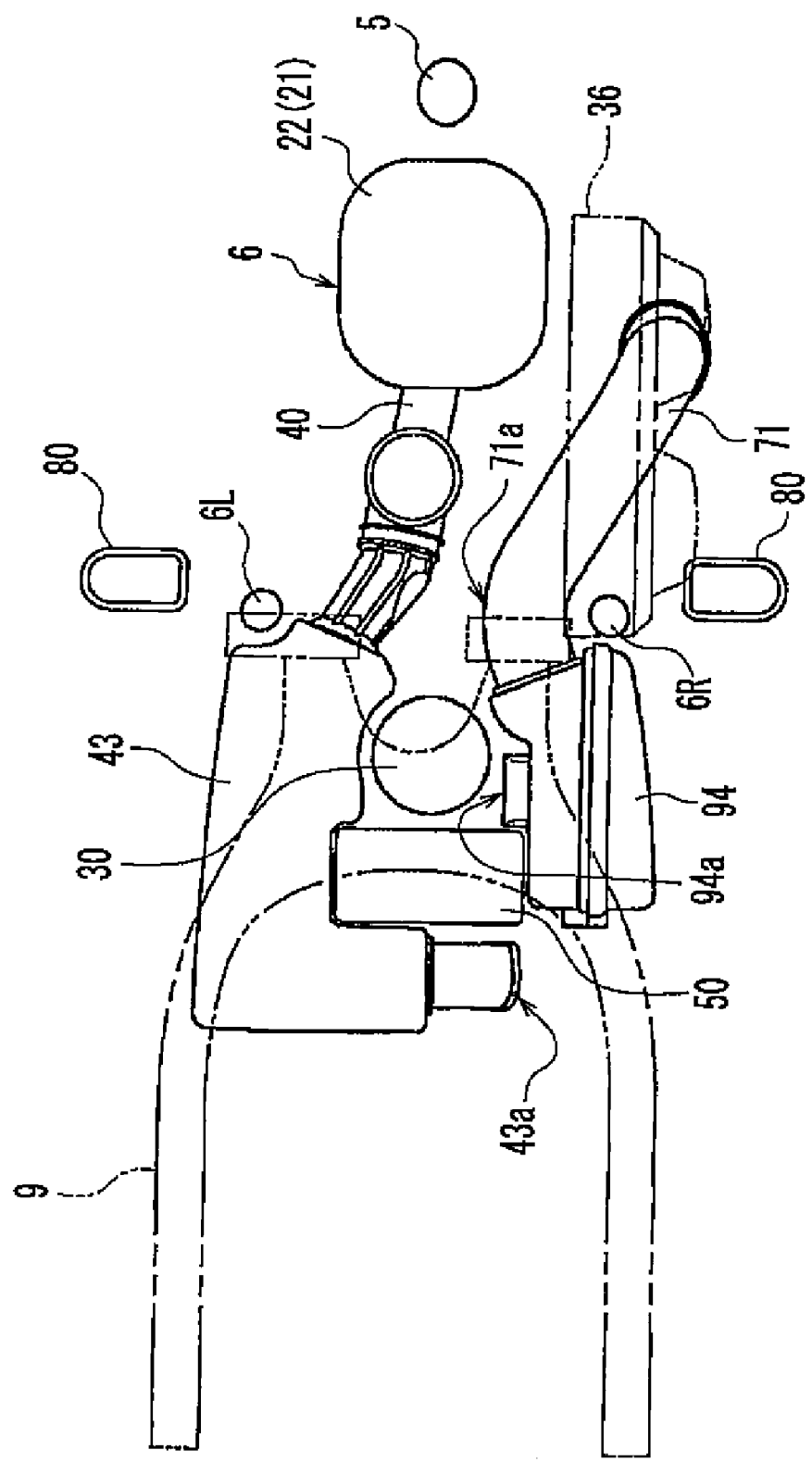
FIG. 4 is a plan view of a part of the motorcycle.

As shown in FIG. 4, which is a plan view showing a layout around seat pillars 6L and 6R, rear cushion unit 30 is provided at a center in a vehicle width direction. As shown in FIG. 3, rear cushion unit 30 is positioned between and couples main tube 6 and rear arm 9. Motorcycle 1 of this embodiment has a mono suspension construction and includes only one rear cushion unit 30. Rear cushion unit 30 is not limited to a rear cushion unit directly coupled to rear arm 9, and may be coupled to rear arm 9 via a link.

An end of an intake duct 71 for inducting cooling air into a belt chamber 38 (see FIG. 5) in transmission casing 36 is connected to a front half part of transmission casing 36. In a right side view as shown in FIG. 3, intake duct 71 extends upward from transmission casing 36, then curves and extends rearward, passing over seat pillar 6R. An air chamber 94 is connected to a rear end of intake duct 71. An air filter is disposed inside air chamber 94. Intake duct 71 and air chamber 94 correspond to an air passage according to the present invention.

As shown in FIG. 4, intake duct 71 extends rearward passing through a space between seat pillars 6L and 6R. Intake duct 71 also passes through a space between engine cylinder 21 and seat pillar 6R, and a space between rear cushion unit 30 and seat pillar 6R. Intake duct 71 has a curving part 71a curving around seat pillar 6R.

Foot rests 80 are provided outside seat pillars 6L and 6R. Curving part 71a is positioned inside an inner end of seat pillar 6R in the vehicle width direction, that is, on the left of seat pillar 6R. Thereby, intake duct 71 passes through a space inside foot rest 80. Meanwhile, a part of intake duct 71 in a vicinity of its connection to transmission casing 36 is positioned outside seat pillar 6R in the vehicle width direction, that is, on the right of seat pillar 6R.

An intake opening 94a for inducting fresh air into air chamber 94 is provided on an inner end (left side) surface of air chamber 94 in the vehicle width direction. Intake opening 94a is positioned below seat 3 (FIG. 1) and above pivot shaft 10 (FIG. 3). Intake opening 94a corresponds to the intake opening of the air passage according to the present invention.

An end of an intake pipe 40 for supplying air to engine 16 is connected to a rear side of cylinder head 22 of engine 16. Intake pipe 40 passes through a space between seat pillars 6L and 6R (FIG. 4), and extends leftward and rearward. An air chamber 43 is connected to a rear end of intake pipe 40. An intake opening 43a for inducting fresh air into air chamber 43 is provided on an inner end (right side) surface of air chamber 43 in the vehicle width direction. Intake opening 43a is positioned below seat 3 (FIG. 1).

As shown in FIG. 3, an exhaust pipe 41 is connected to a front side of cylinder head 22. Exhaust pipe 41 extends forward and obliquely rightward and downward from cylinder head 22, then curves rearward, passes through a space below transmission casing 36 of engine unit 15, and extends further rearward. A muffler 42 is connected to a rear end of exhaust pipe 41. Muffler 42 is disposed on the right of rear wheel 13 (FIG. 1).

As shown in FIG. 4, a battery 50 is provided in the rear of rear cushion unit 30 and between air chamber 43 and air chamber 94. Battery 50 is disposed below seat 3 (see FIG. 1).

—Construction of Engine Unit 15—

Figure 5:
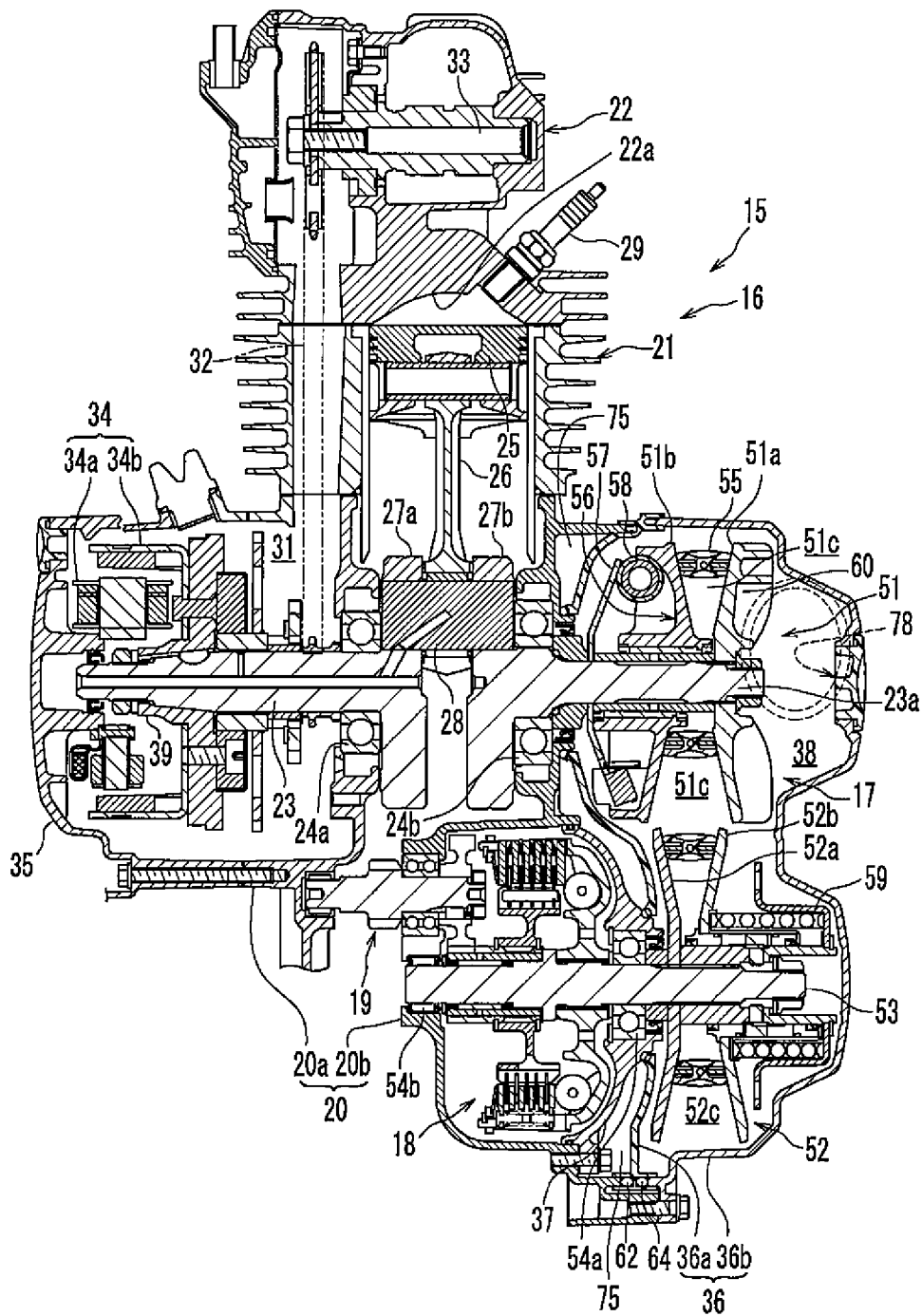
FIG. 5 is a cross sectional view of an engine unit of the motorcycle.

As shown in FIG. 5, engine unit 15 includes engine 16, CVT 17, a centrifugal clutch 18, and a speed reduction mechanism 19. Here, engine 16 is a four cycle single cylinder engine. However, engine 16 according to the present invention may also be a two cycle or a multi-cylinder engine.

Engine 16 includes crankcase 20, cylinder 21 connected to crankcase 20, and cylinder head 22 connected to cylinder 21. Crankcase 20 has two separate case blocks, that is, a first case block 20a positioned on the left and a second case block 20b positioned on the right. Case blocks 20a and 20b face each other in the vehicle width direction.

A crankshaft 23 housed in crankcase 20 extends in the vehicle width direction and is disposed horizontally. Crankshaft 23 is supported by first case block 20a via a bearing 24a, and supported by second case block 20b via a bearing 24b.

A piston 25 is slidably inserted into cylinder 21. An end of a connecting rod 26 is connected to piston 25. A crankpin 28 is provided between a left crank arm 27a and a right crank arm 27b of crankshaft 23. The other end of connecting rod 26 is coupled to crankpin 28.

A concaving part 22a, and intake and exhaust ports communicatively connected to concaving part 22a, are formed in cylinder head 22. An ignition plug 29 is inserted into cylinder head 22. Intake pipe 40 is connected to the intake port in cylinder head 22, and exhaust pipe 41 is connected to the exhaust port in cylinder head 22.

As shown in FIG. 5, a cam chain chamber 31 for connecting an inside of crankcase 20 and an inside of cylinder head 22 together is formed at a left part inside cylinder 21. A timing chain 32 is disposed in cam chain chamber 31. Timing chain 32 is wound around crankshaft 23 and a camshaft 33. Camshaft 33 rotates following a rotation of crankshaft 23, and opens or closes an intake valve or an exhaust valve.

A generator case 35 for accommodating a generator 34 is mounted on the left side of a front half part of first case block 20a. Transmission casing 36 for accommodating CVT 17 is mounted on the right side of second case block 20b. An opening formed on the right side of a rear half part of second case block 20b is blocked by a clutch cover 37.

Transmission casing 36 is formed independently from crankcase 20 and has an inner case 36a for covering an inner (left) part of CVT 17 and an outer case 36b for covering an outer (right) part of CVT 17 in the vehicle width direction. Inner case 36a is mounted on the right side of crankcase 20. Outer case 36b is mounted on the right side of inner case 36a. A belt chamber 38 for accommodating CVT 17 is formed in a space formed between inner case 36a and outer case 36b. An intake opening 78 is formed on a top surface of outer case 36b. Intake duct 71 is connected to intake opening 78.

A primary sheave 51 of CVT 17 is fitted on a right end of crankshaft 23 that passes through second case block 20b and inner case 36a, and extends to belt chamber 38. Therefore, primary sheave 51 rotates following rotation of crankshaft 23. This right end of crankshaft 23 (strictly, a part more rightward than bearing 24b) forms a primary sheave shaft 23a.

Generator 34 is mounted at a left end of crankshaft 23 that passes through first case block 20a and extends into generator case 35. Generator 34 includes a rotor 34b facing a stator 34a. Rotor 34b is fixed to a sleeve 39 rotating together with crankshaft 23. Stator 34a is fixed to generator case 35.

A secondary sheave shaft 53 in which a secondary sheave 52 is fitted is disposed parallel to crankshaft 23 in a rear half part in crankcase 20. A right part of a center part of secondary sheave shaft 53 is supported by clutch cover 37 via a bearing 54a. A left part of secondary sheave shaft 53 is supported by a left end of second case block 20b via a bearing 54b. Secondary sheave 52 is coupled to a right end of secondary sheave shaft 53.

CVT 17 includes a V-belt 55 wound around a primary sheave 51 and a secondary sheave 52. Primary sheave 51 is mounted on the right side of crankshaft 23. Secondary sheave 52 is coupled to a right part of secondary sheave shaft 53.

Primary sheave 51 includes a fixed sheave half body 51a positioned outside in the vehicle width direction, a movable sheave half body 51b positioned inside in the vehicle width direction and facing fixed sheave half body 51a. Fixed sheave half body 51a is fixed to a right part of primary sheave shaft 23a, and rotates together with primary sheave 23a. Movable sheave half body 51b is disposed on the left side of fixed sheave half body 51a, and is slidably mounted on primary sheave shaft 23a. Therefore, movable sheave half body 51b rotates together with primary sheave 23a, and is slidable in the axis direction of primary sheave shaft 23a. A belt groove 51c is formed between fixed sheave half body 51a and movable sheave half body 51b. A cam surface 56 is formed on the left side of movable sheave half body 51b. A cam plate 57 is disposed on the left side of cam surface 56. A roller weight 58 is disposed between cam surface 56 and cam plate 57.

Secondary sheave 52 includes a fixed sheave half body 52a positioned inside in the vehicle width direction and a movable sheave half body 52b positioned outside in the vehicle width direction and facing fixed sheave half body 52a. Movable sheave half body 52b is mounted on a right part of secondary sheave shaft 53. Movable sheave half body 52b rotates together with secondary sheave shaft 53, and is slidable in the axis direction of secondary sheave shaft 53. A compression coil spring 59 is provided on the right side of secondary sheave 52. Movable sheave half body 52b receives leftward pressure from compression coil spring 59. An axis part of fixed sheave half body 52a is a cylindrical slide collar, and is spline-fitted into secondary sheave shaft 53. A V-shaped belt groove 52c is formed between fixed sheave half body 52a and movable sheave half body 52b.

Figure 6:
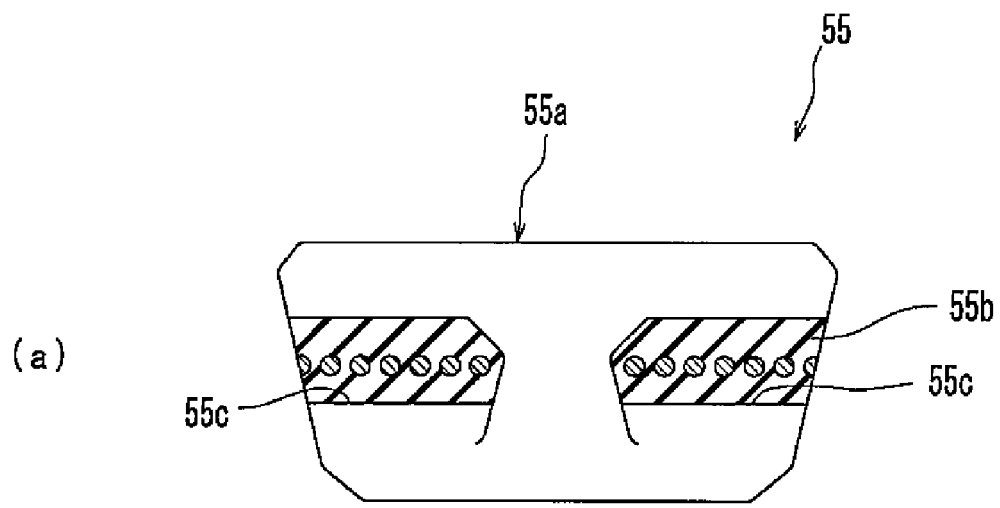
FIG. 6(*a*) is a cross sectional view of a resin block belt of the motorcycle.
Figure 6:
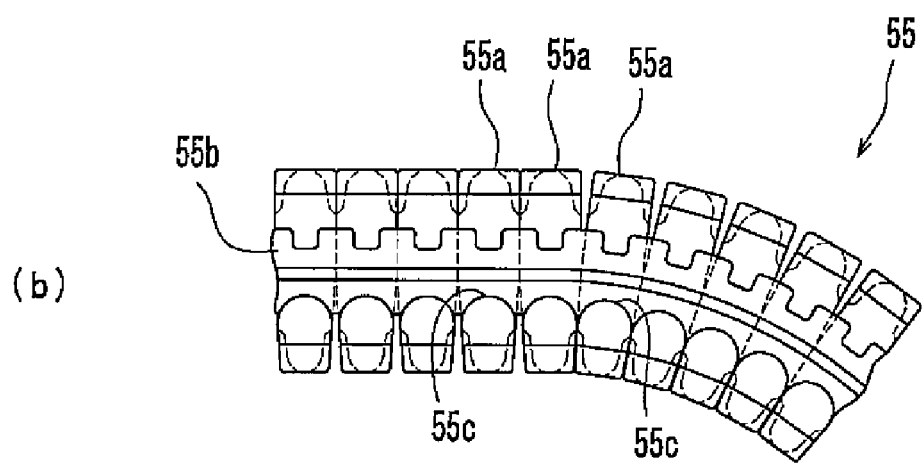

As shown in FIG. 6(a), V-belt 55 includes a plurality of resin blocks 55a formed into a shape such that a letter H is rotated by a right angle and a pair of coupling members 55b for coupling resin blocks 55a together. Coupling member 55b is fitted in a concaving part 55c formed from a side surface of resin block 55a toward a center part, and extends in a direction that resin blocks 55a are arrayed as shown in FIG. 6(b). Resin block 55a is formed into a V-shape to match the V-shapes of belt grooves 51c and 52c of primary and secondary sheaves 51 and 52 (FIG. 5).

As shown in FIG. 5, a plurality of impellers 60 are formed at a right part of fixed sheave half body 51a of primary sheave 51. Intake duct 71 (FIG. 1) is connected to intake opening 78 formed on a top surface and front half part (above primary sheave 51) of transmission casing 36. Therefore, intake duct 71 is connected to a part more forward than a rear end of primary sheave 51.

With such a construction, when fixed sheave half body 51a rotates together with primary sheave shaft 23a, impellers 60 induct air into belt chamber 38 through intake opening 78, and air inside belt chamber 38 is discharged outside. In this embodiment, impellers 60 are formed to helically extend outside in a diameter direction from a center part of fixed sheave half body 51a. However, the shape and number of impellers is not limited. In addition, impellers as a body separated from fixed sheave half body 51a can be provided outside fixed sheave half body 51a.

Figure 7:
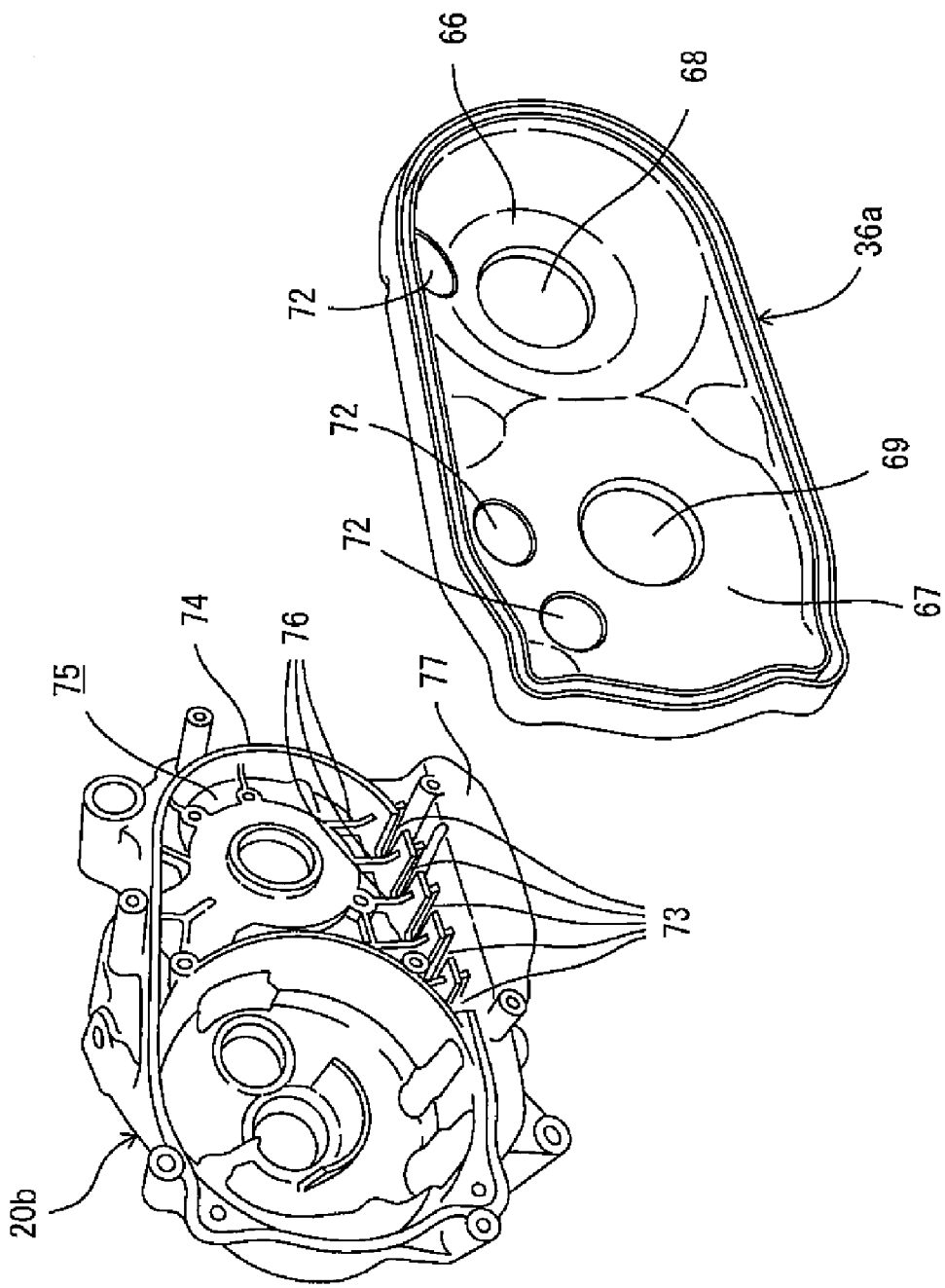
FIG. 7 is a perspective view of a second case block and an inner case of the motorcycle.

As shown in FIG. 7, which is a perspective view of second case block 20b and inner case 36a, a front half part 66 of inner case 36a is formed into a bowl shape swelling out leftward. A rear half part of inner case 36a is formed into a bowl shape swelling out rightward. A hole 68 for inserting primary sheave shaft 23a is formed on front half part 66. A hole 69 for inserting secondary sheave shaft 53 is formed on rear half part 66. In FIG. 7, clutch cover 37 interposed between inner case 36a and second case block 20b is not shown.

Ventilation ports 72 are provided on inner case 36a. In this embodiment, ventilation ports 72 are circular, however, the shape of ventilation ports 72 is not limited. Three ventilation ports are formed above a vertical center of inner case 36a, however, the position and number of ventilation ports 72 is not limited. In this embodiment, ventilation ports 72 are provided on both front and rear half parts 66 and 67. However, a ventilation port 72 can be formed on just one of front and rear half parts 66 and 67.

A plurality of ventilation ports 73 are formed at a lower right part of second case block 20b. Specifically, second case block 20b includes a periphery part 74 installed upright rightward. Periphery part 74 has a shape corresponding to an outline shape of transmission casing 36. A lower part of periphery part 74 has a notched part, in which notches are formed as slits to form a comb shape. Therefore, a space 75 divided by second case block 20b and inner case 36a is communicated outside of engine unit 15 through ventilation ports 73. In addition, because a right part of the rear half part of second case block 20b is covered by clutch cover 37, space 75 is formed between clutch cover 37 and inner case 36a in the rear half part of second case block 20b (FIG. 5).

Reinforcement ribs 76 are provided on the comb-shaped part of periphery part 74. An oil pan 77 is provided below ventilation ports 73.

With the above construction, air in belt chamber 38 is introduced into space 75 through ventilation ports 72 of inner case 36a, and discharged toward oil pan 77 through ventilation ports 73 of second case block 20b. As a result, the air is discharged outside engine unit 15.

As described above, a lower part of periphery part 74 of second case block 20b is formed into a comb-shaped part that forms a plurality of slit-like ventilation ports 73. The shape of ventilation ports 73 is not limited to a slit, and can be an opening shaped differently, such as a circular shape. The shape, size and number of ventilation ports 73 is not specifically limited.

Figure 8:
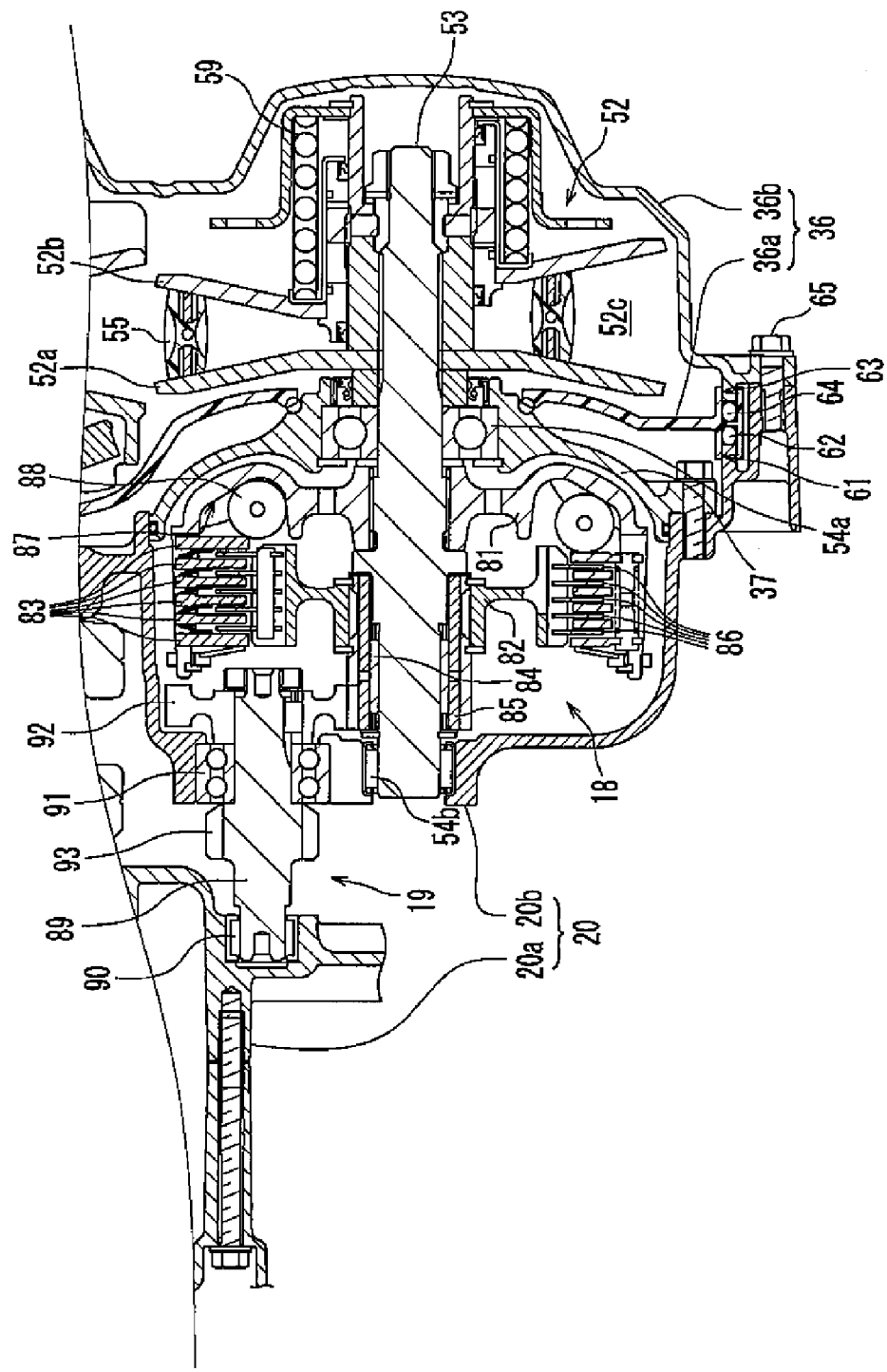
FIG. 8 is an enlarged cross sectional view showing a vicinity of a centrifugal clutch of the engine unit of FIG. 5.

As shown in FIG. 8, a sealing recess 61 is formed on the left side of the periphery part of inner case 36a. A right periphery part of second case block 20b is fitted in sealing recess 61. An O-ring 62 is inserted in a space between inner case 36a and second case clock 20b in sealing recess 61. A sealing recess 63 is formed on the right side of the periphery part of inner case 36a. The periphery part of outer case 36b is fitted in sealing recess 63. An O-ring 64 is inserted in a space between inner case 36a and outer case 36b in sealing recess 63. Outer case 36b and second case block 20b are fastened together by a bolt 65 with inner case 36a interposed between them.

Centrifugal clutch 18 is mounted on the left side of secondary sheave shaft 53. Centrifugal clutch 18 is a wet type multiple disc type clutch, and includes a generally cylindrical clutch housing 81 and a clutch boss 82. Clutch housing 81 is spline-fitted in secondary sheave shaft 53, and rotates integrally with secondary sheave shaft 53. A plurality of ring-shaped clutch plates 83 is mounted in clutch housing 81. Clutch plates 83 are arranged in the axial direction of secondary sheave shaft 53 at intervals.

A cylindrical gear 85 is rotatably fitted around a left part of secondary sheave shaft 53 via a bearing 84. Clutch boss 82 is disposed inside in the radial direction of clutch plate 83 and outside in the radial direction of gear 85, and engages with gear 85. Therefore, gear 85 rotates together with clutch boss 82. A plurality of ring-shaped friction plates 86 is mounted outside in the radial direction of clutch boss 82. Friction plates 86 are arranged in the axial direction of secondary sheave shaft 53 at intervals. Each friction plate 86 is disposed between neighboring clutch plates 83, 83.

A plurality of cam surfaces 87 is formed on the left side of clutch housing 81. A roller weight 88 is disposed between cam surfaces 87 and the rightmost clutch plate 83 facing cam surfaces 87.

In the centrifugal clutch 18, a state of the clutch is automatically switched between a clutch-in (engaging) state and a clutch-off (disengaging) state corresponding to the amount of centrifugal force acting on roller weight 88.

That is, as a rotational speed of clutch housing 81 becomes a prescribed speed or more, roller weight 88 receives a centrifugal force and moves outside in the radial direction. Roller weight 88 pushes clutch plates 83 leftward. As a result, clutch plates 83 are compressedly contacted with friction plates 86. A driving force of secondary sheave shaft 53 is transmitted through centrifugal clutch 18 to an output shaft. This is a clutch-in state.

Meanwhile, as a rotational speed of clutch housing 81 becomes less than a prescribed speed, a centrifugal force acting on roller weight 88 becomes small, and roller weight 88 moves inside in the radial direction. As a result, clutch plates 83 and friction plates 86 are released from compressed contact and a driving force of secondary sheave shaft 53 is not transmitted to the output shaft. This is a clutch-off state. In FIG. 8, the side lower than secondary sheave shaft 53 shows a clutch-in state and the upper side shows a clutch-out state.

Speed reduction mechanism 19 is interposed between centrifugal clutch 18 and the output shaft and has a speed changing shaft 89 disposed parallel to secondary sheave shaft 53. Speed changing shaft 89 is rotatably supported by first case block 20a via a bearing 90, and is rotatably supported by second case block 20b via a bearing 91. A first speed changing gear 92 for engaging with gear 85 is provided at a right end of speed changing gear 89.

A second speed changing gear 93 with a diameter smaller than first speed changing gear 92 is provided at a center part of speed changing shaft 89. Second speed changing gear 93 engages with an output shaft or a gear provided on the output shaft.

With such a construction, clutch boss 82 and the output shaft are coupled via gear 85, first speed changing gear 92, speed changing shaft 89, second speed changing gear 93 and so forth. Therefore, the output shaft rotates following rotation of clutch boss 82. A drive transmission mechanism such as a chain for transmitting a drive of the output shaft to rear wheel 13 is wound around the output shaft. The drive transmission mechanism can be a member other than a chain, such as a transmission belt, a gear mechanism combining a plurality of gears, and a drive shaft.

The foregoing is the construction of engine unit 15. Next, a cooling operation of the CVT is described.

—Cooling Operation of CVT 17—

When engine unit 15 operates, primary sheave shaft 23a of CVT 17 rotates, and impellers 60 of fixed sheave half body 51a of primary sheave 51 rotate with it. As a result, a suction force inducting air from intake duct 71 into belt chamber 38 is generated.

Accordingly, air is inducted into air chamber 94 through intake opening 94a (FIG. 4). The air passes through the filter and is cleaned up, and then is inducted into belt chamber 38 through intake duct 71. Air inducted into belt chamber 38 flows through spaces around and cools down primary sheave 51, secondary sheave 52 and V-belt 55.

After cooling down primary sheave 51, secondary sheave 52 and V-belt 55, the air is discharged from belt chamber 38 through ventilation ports 72 of inner case 36a. The air flows into space 75 between inner case 36a and second case block 20b (FIG. 7). Air in space 75 is discharged outside through ventilation ports 73 formed at the lower part of second case block 20b. CVT 17 is continuously and regularly cooled down by this air flow.

As described, in this embodiment, intake duct 71 forming a part of the intake passage (air passage) extends rearward from transmission casing 36 passing over seat pillar 6R in a side view. Therefore, the intake passage is elongated and may interrupt with body frame 2. However, in this embodiment, intake duct 71 has curving part 71a curving around seat pillar 6R. Intake duct 71 thereby curves and keeps clear of seat pillar 6R to prevent an interruption between intake duct 71 and seat pillar 6R.

According to this embodiment, because intake duct 71 is long, noise of CVT 17 that occurs inside belt chamber 38 is damped largely while passing through intake duct 71. As mentioned above, a major factor of noise occurring in CVT 17 is pitch noise due to a large number of resin blocks 55a included in V-belt 55. Pitch noise is a high frequency sound that highly tends to travel linearly. Therefore, the pitch noise is largely attenuated at curving part 71a of intake duct 71 when passing through intake duct 71. Accordingly, release of noise of CVT 17 to the outside is sufficiently prevented because of a synergetic effect between the large length of intake duct 71 and the inclusion of curving part 71a.

While it is generally preferable that an air passage should not have a curving part in the view of ventilation such as smooth introduction or discharge of air, in this embodiment, curving part 71a is purposely provided in intake duct 71 to prevent high frequency sounds, which have a high tendency to travel straight, from leaking outside.

As shown in FIG. 5, in this embodiment, intake opening 78 to which intake duct 71 is connected is formed at the front half part of transmission casing 36 (above primary sheave 51). Therefore, intake duct 71 is connected to a part forward of the rear end of primary sheave 51. Thereby, a length of intake duct 71 extending rearward is larger and noise of CVT 17 is more effectively prevented.

A pair of right and left seat pillars 6R and 6L are provided in motorcycle 1. A part of engine unit 15 is supported by seat pillars 6R and 6L. Therefore, a rigidity of body frame 2 is enhanced. On the other hand, because seat pillars 6L and 6R are provided on the right and on the left as a pair, seat pillars 6L and 6R protrude in the vehicle width direction. However, with this embodiment, intake duct 71 passes through a space between seat pillars 6L and 6R. Thereby, noise of CVT 17 can be prevented, and also motorcycle 1 can be intended to be slimly formed.

In motorcycle 1, right and left foot rests 80 are disposed outside of seat pillars 6L and 6R in the vehicle width direction. However, intake duct 71 passes through a space between seat pillars 6L and 6R. Therefore, although intake duct 71 extends rearward passing over seat pillar 6R, intake duct 71 does not disturb the feet of a driver on foot rests 80.

Also, in this embodiment, intake duct 71 extends more rearward than seat pillar 6R, and thus it facilitates a prevention of intrusion of muddy water and the like splashed up by front wheel 12 into intake duct 71.

Intake opening 94a of air chamber 94 of motorcycle 1 is positioned above pivot shaft 10. Therefore, intake opening 94a is positioned relatively away from the ground such that intake opening 94a is not apt to induct water and dust. Intake opening 94a is positioned below and covered by seat 3. Thus, intrusion of water, dust and so forth into air chamber 94 is prevented. Therefore, motorcycle 1 facilitates supply of fresh air into belt chamber 38.

Intake duct 71 passes through a space between cylinder 21 of engine 16 and seat pillar 6R. Also, intake duct 71 passes through a space between seat pillars 6L and 6R. Further, intake duct 71 passes through a space between rear cushion unit 30 and seat pillar 6R. Therefore, a space between seat pillars 6L and 6R, a space between cylinder 21 and seat pillar 6R, and a space between rear cushion unit 30 and seat pillar 6R are effectively used to provide air passage. Accordingly, motorcycle 1 certainly provides sufficient space for air passages without making the vehicle larger. As a result, an air passage having a sufficient cross sectional area of a flow passage is realized.

Curving part 71a of intake duct 71 is positioned inside the inner end of seat pillar 6R in the vehicle width direction, that is, to the left of sear pillar 6R. Meanwhile, a part of intake duct 71 in a vicinity of its connection to transmission casing 36 is positioned outside seat pillar 6R in the vehicle width direction, that is, to the right of seat pillar 6R. In other words, intake duct 71 reaches a part inside seat pillar 6R from a part outside seat pillar 6R. Intake duct 71 largely curves. Therefore, high frequency sound occurring in CVT 17 is more effectively prevented.

As shown in FIG. 5, in this embodiment, a right end of primary sheave shaft 23a is positioned inside a right end of secondary sheave shaft 53 in the vehicle width direction. Thus, primary sheave 51 has more space on a lateral side of its sheave shaft than does secondary sheave 52. Intake duct 71 is connected to a part of transmission casing 36 closer to primary sheave 51 and thus is connected to the part that has more space on its lateral side. Therefore, as shown in FIG. 4, a projection of the connection part between intake duct 71 and transmission casing 36 in a transverse direction is prevented, and motorcycle 1 can thereby be slimmed down.

As shown in FIG. 3, in this embodiment, exhaust pipe 41 extends rearward passing through a space below intake duct 71 and transmission casing 36. Thus, an interruption between exhaust pipe 41 and intake duct 71 is prevented. Therefore, intake duct 71 can curve without interruption by exhaust pipe 41, and a sufficient length of intake duct 71 is assured.

Second Embodiment

Figure 9:
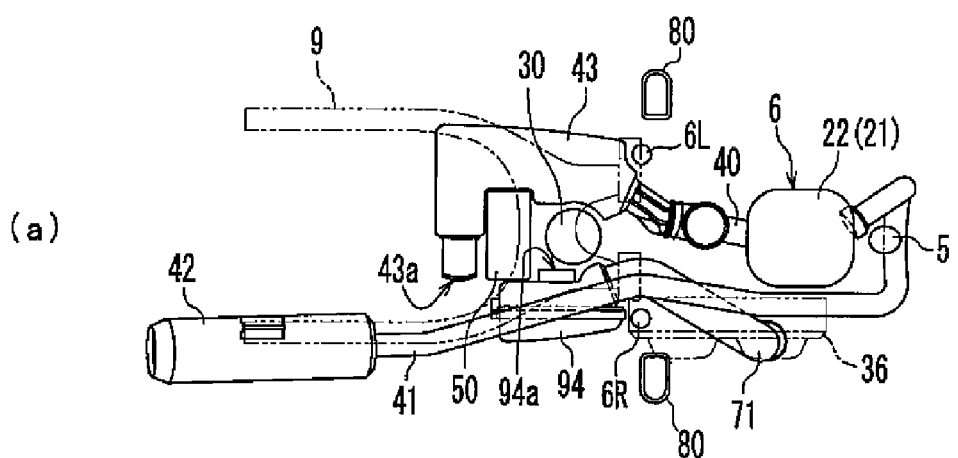
FIG. 9(*a*) is a plan view and FIG. 9(*b*) is a right side view of a part of a motorcycle according to a second embodiment of the invention.
Figure 9:
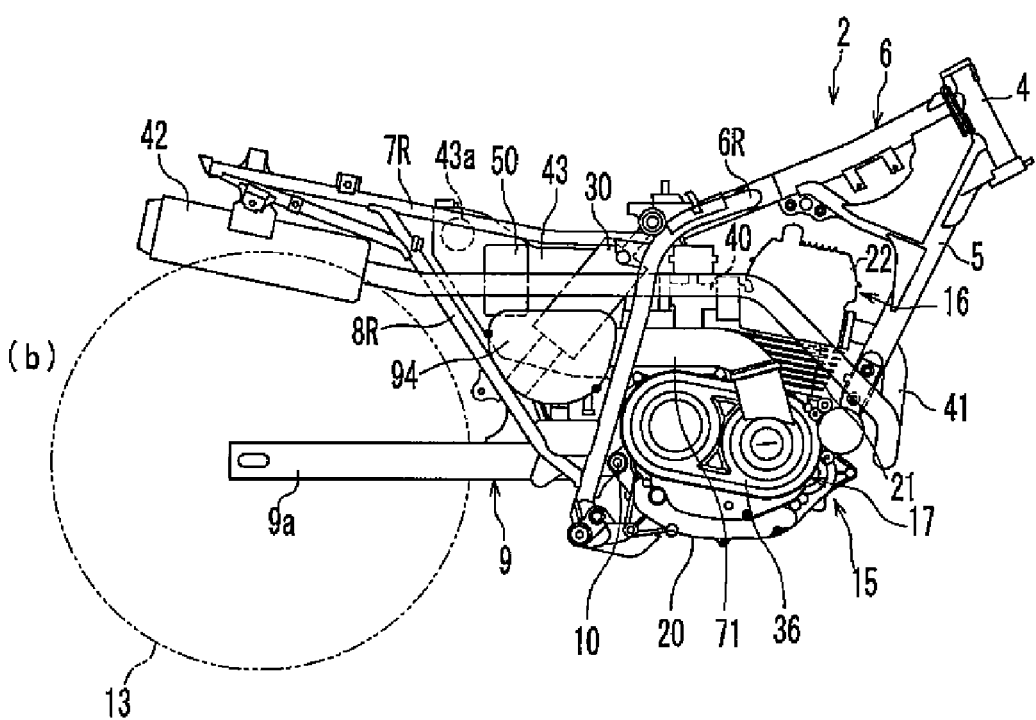

As shown in FIG. 3, in the first embodiment, exhaust pipe 41 extends forward and obliquely rightward downward, then curves rearward, passes through a space below transmission casing 36, and extends further rearward. However, as shown in FIGS. 9(a) and (b), in a second embodiment, a length of air chamber 94 in the vertical direction is shortened to secure a space above intake duct 71 and air chamber 94, and thereby exhaust pipe 41 passes through the space.

Specifically, exhaust pipe 41 extends forward and obliquely rightward and downward from cylinder head 22, then curves rearward and upward, passes through the space above intake duct 71 and air chamber 94, and extends further rearward. Muffler 42 is connected to a rear end of exhaust pipe 41 on the right side above rear wheel 13. Other parts of construction are similar to the first embodiment.

In this embodiment, exhaust pipe 41 is disposed above intake duct 71 and air chamber 94. Thereby, a sufficiently large space is obtained below frame 2.

Third Embodiment

Figure 10:
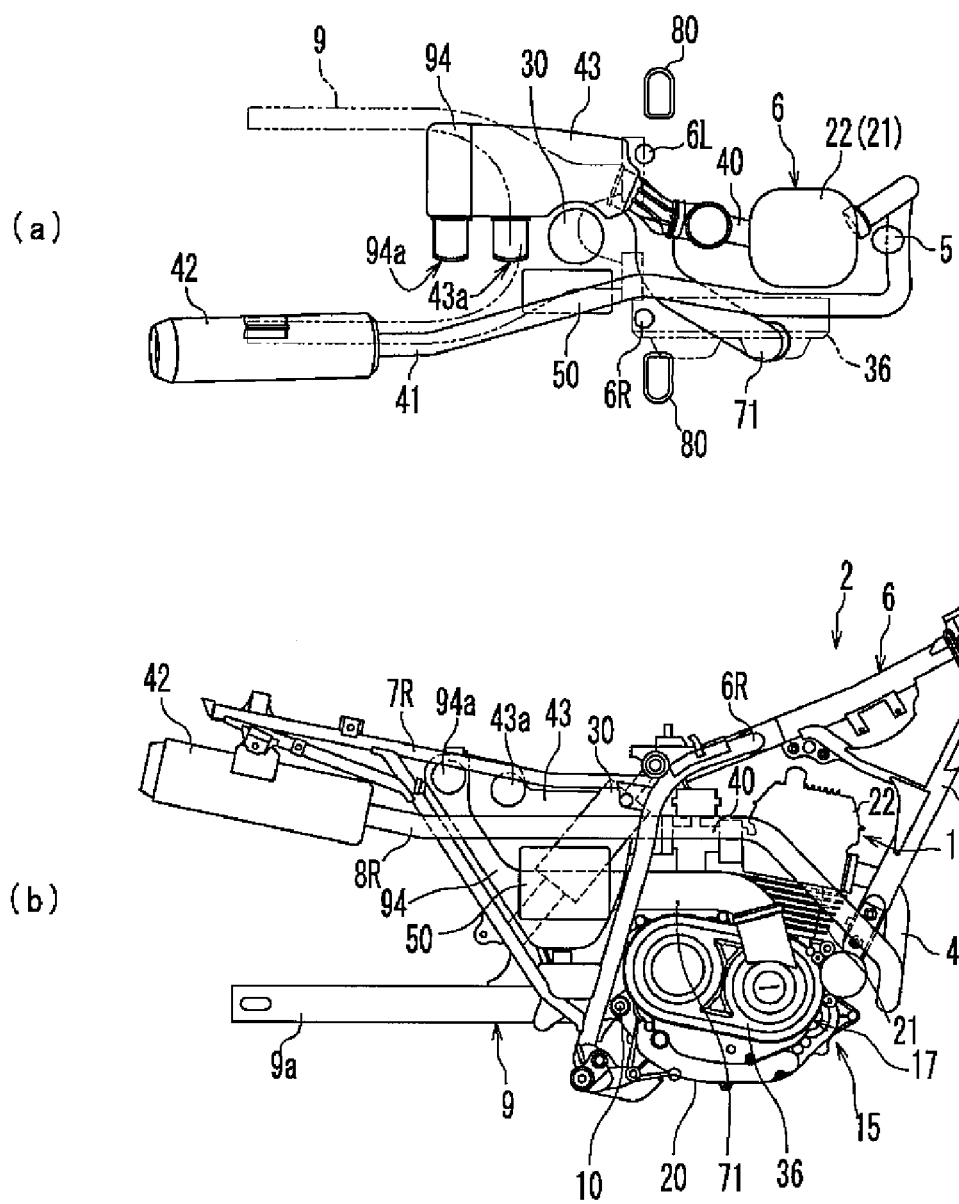
FIG. 10(a) is a plan view and FIG. 10(b) is a right side view of a part of a motorcycle according to a third embodiment of the invention.

As shown in FIG. 4, in the first embodiment, transmission casing 36 to which the front part of intake duct 71 is connected, and air chamber 94 forming the rear part of the air passage are disposed on the same (right) side in the vehicle width direction. However, as shown in FIGS. 10(a) and (b), in the third embodiment, transmission casing 36 is disposed on the right side and air chamber 94 is disposed on the opposite (left) side in the vehicle width direction.

With such dispositions of air chamber 94 and intake duct 71, in this embodiment, air chambers 94 and 43 are disposed on the same (left) side in the vehicle width direction. In this embodiment, air chambers 94 and 43 are formed into a united case body. Specifically, two spaces are formed inside a case body. That is, a case body is demarcated into a space for air chamber 94 and a space for air chamber 43. Also, in this embodiment, the rear end of intake duct 71 is disposed on the left side in the vehicle width direction. Thereby, it makes a space on the opposite (right) side. To effectively use this space, battery 50 is disposed on the right side. Further, exhaust pipe 41 is disposed on the right side in and above transmission casing 36 similarly to the second embodiment. Other parts of construction are similar to the first embodiment.

In this embodiment, intake duct 71 extends from the right to the left side in the vehicle width direction, and thereby intake duct 71 can be made longer. Air chambers 94 and 43 are formed into a united case body and are made more compact. This assures a large space above transmission casing 36. Thereby, with this embodiment, intake duct 71 can be largely curved and noise of CVT 17 can be more effectively prevented.

Similarly to the second embodiment, exhaust pipe 41 is disposed in a space above transmission casing 36, and thereby a sufficiently large space is provided below frame 2.

Fourth Embodiment

Figure 11:
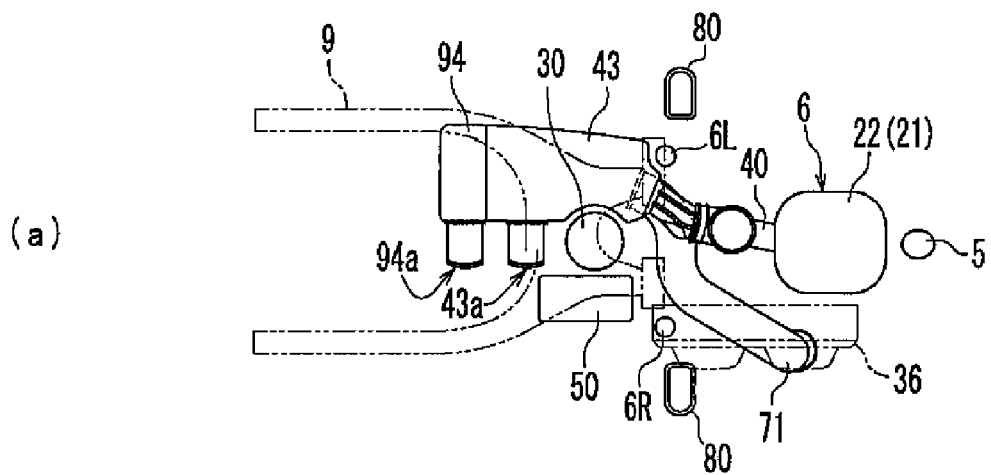
FIG. 11(a) is a plan view and FIG. 11(b) is a right side view of a part of a motorcycle according to a fourth embodiment of the invention.
Figure 11:
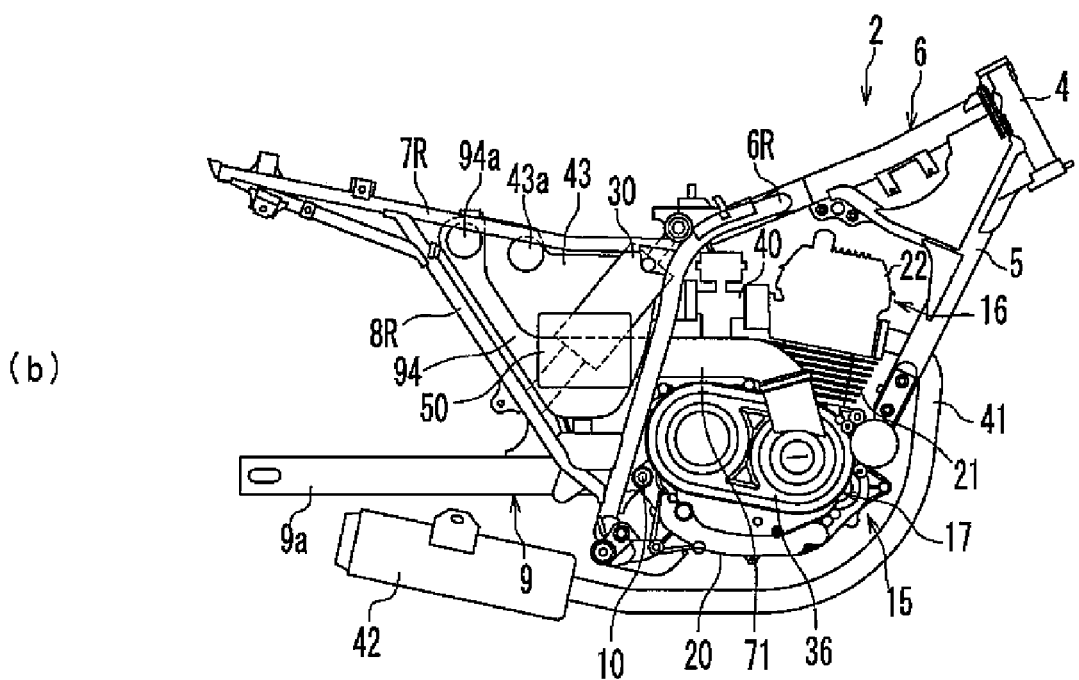

As shown in FIGS. 11(a) and (b), in a fourth embodiment, exhaust pipe 41 and muffler 42, which are disposed above transmission casing 36 in the third embodiment, are disposed below transmission casing 36, similarly to the first embodiment. With such a mode, the air passage for inducting air into belt chamber 38 can be formed long and noise prevented, similar to all embodiments described above. Also, with this embodiment, an interruption between intake duct 71 and exhaust pipe 41 and an interruption between intake pipe 40 and exhaust pipe 41 is prevented.

Fifth Embodiment

Figure 12:
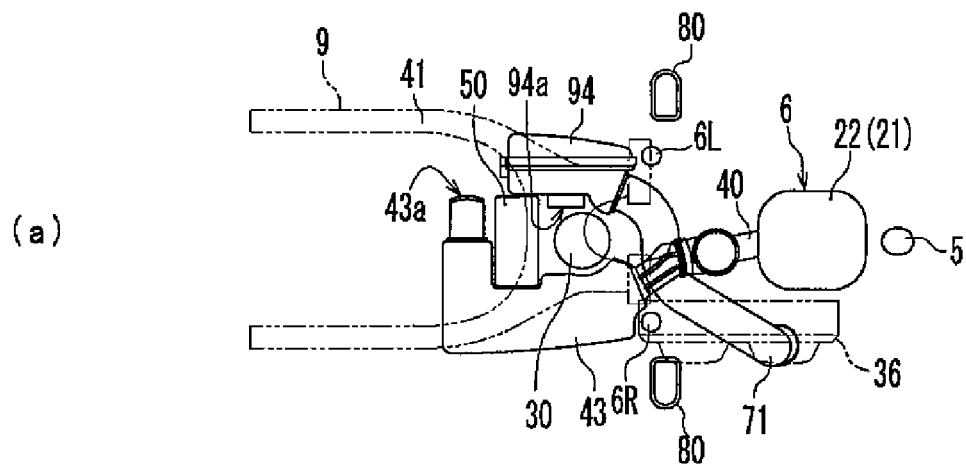
FIG. 12(a) is a plan view and FIG. 12(b) is a right side view of a part of a motorcycle according to a fifth embodiment of the invention.
Figure 12:
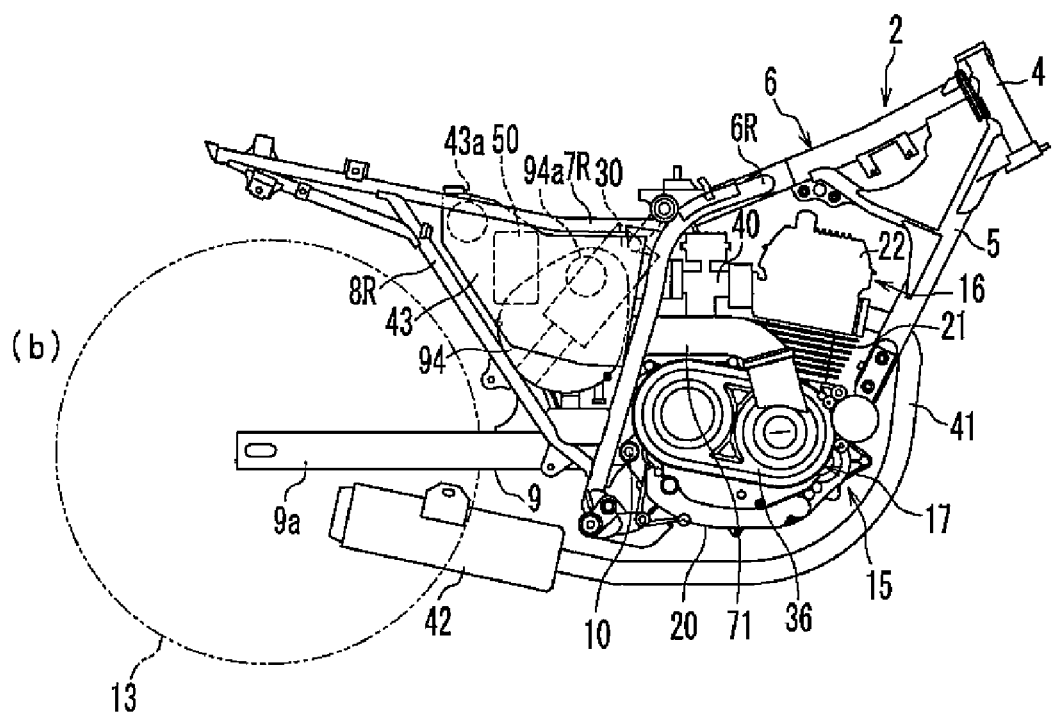

As shown in FIGS. 12(a) and (b), in the fifth embodiment, similar to the third embodiment, air chamber 94 to which the rear end of intake duct 71 is connected is disposed on the left side in the vehicle width direction, which is the side opposite to transmission casing 36. Corresponding to this disposition, air chamber 43 of engine 16 is disposed on the right side in the vehicle width direction, which is the side opposite to air chamber 94. Other parts of construction are similar to the first embodiment.

With this embodiment, similar to the third embodiment, intake duct 71 extends from the right to the left side in the vehicle width direction, and thus intake duct 71 can be made long. Also, intake duct 71 can be largely curved. Therefore, with this embodiment, noise of CVT 17 is effectively prevented also. Air chamber 43 is disposed on the side opposite to air chamber 94 in the vehicle width direction, and thereby those parts can be laid out in a good balance. Therefore, with this embodiment, the air passage can be formed long without increasing a width of the vehicle. An interruption between intake duct 71, intake pipe 40 and exhaust pipe 41 is prevented with this embodiment also.

Sixth Embodiment

Figure 13:
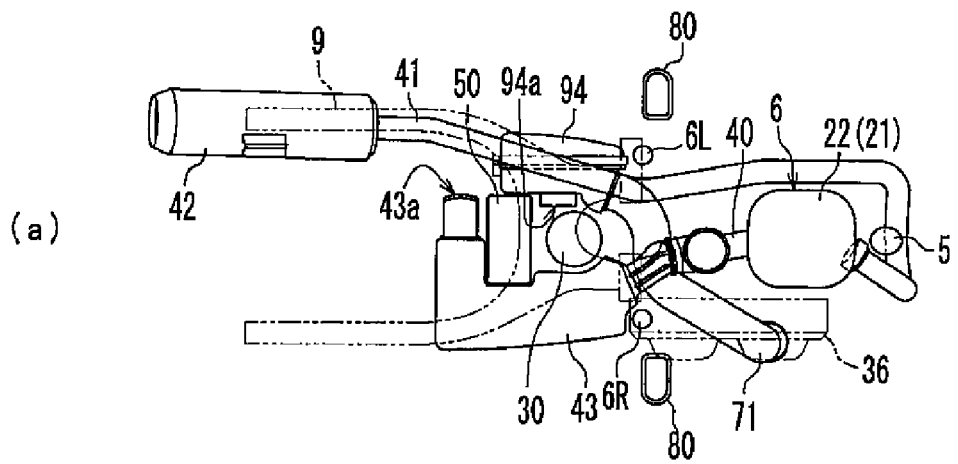
FIG. 13(a) is a plan view and FIG. 13(b) is a right side view of a part of a motorcycle according to a sixth embodiment of the invention.
Figure 13:
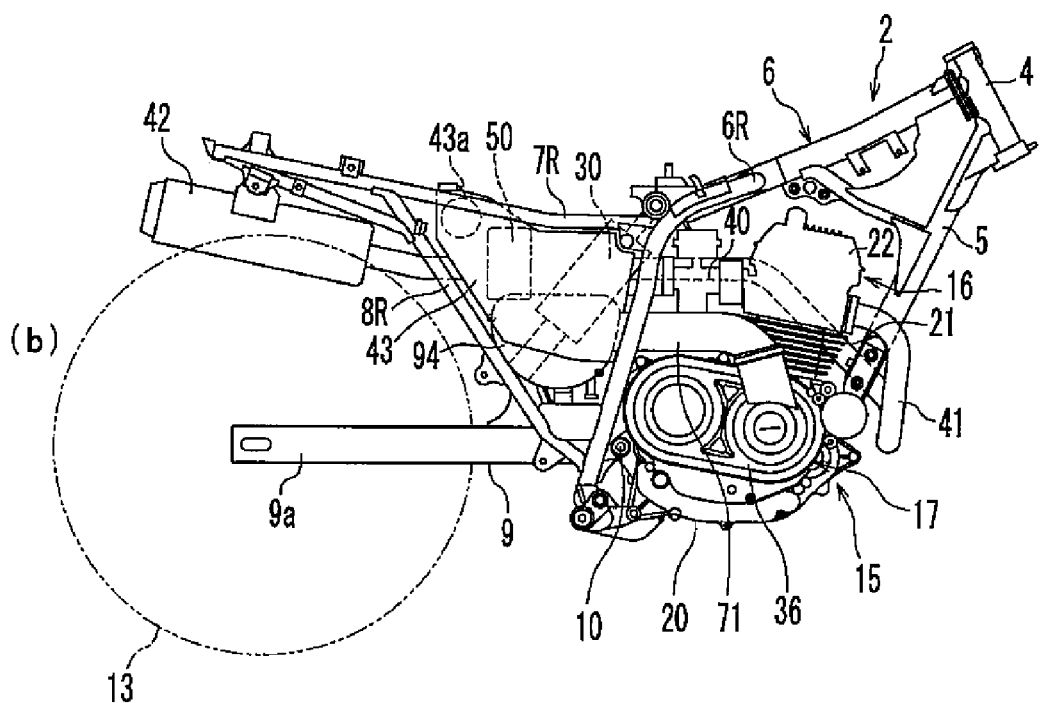

As shown in FIG. 12(b), in the fifth embodiment, exhaust pipe 41 extends forward and obliquely rightward and downward from cylinder head 22, then curves rearward, passes through a space below transmission casing 36, and extends further rearward. However, as shown in FIGS. 13(a) and (b), in the sixth embodiment, a vertical length of air chamber 94 is shortened to assure a space above air chamber 94. Thereby, exhaust duct 41 passes through this space.

Specifically, exhaust pipe 41 extends forward and obliquely leftward and downward from cylinder head 22, then curves rearward, passes through a space inside seat pillar 6L and a space above air chamber 94, and extends further rearward. Muffler 42 is connected to the rear end of exhaust pipe 41 and is disposed on the left side above rear wheel 13. Other parts of construction are similar to the fifth embodiment.

In this embodiment, noise of CVT 17 is also effectively prevented. Exhaust pipe 41 is disposed above air chamber 94, and a sufficiently large space is thereby obtained below frame 2.

Seventh Embodiment

Figure 14:
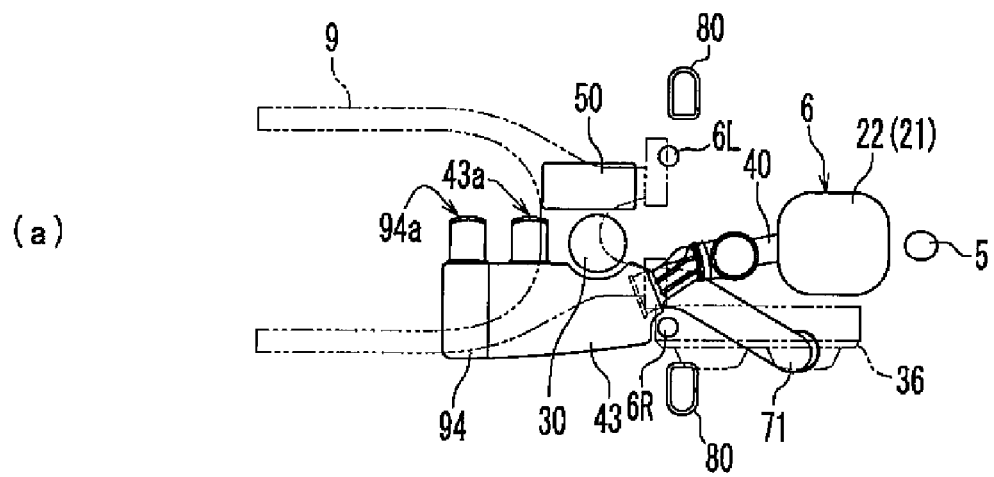
FIG. 14(a) is a plan view and FIG. 14(b) is a right side view of a part of a motorcycle according to a seventh embodiment of the invention.
Figure 14:
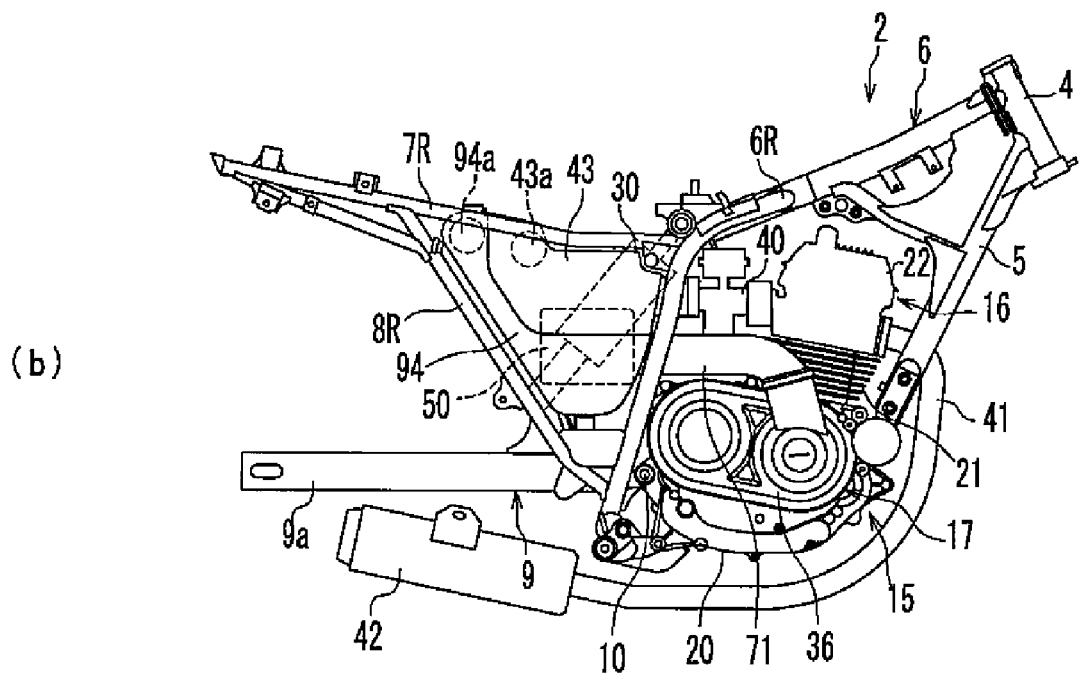

As shown in FIGS. 14(a) and (b), in the seventh embodiment, air chamber 43 is disposed on the same side as air chamber 94 (the right side) in the vehicle width direction, and air chambers 43 and 94 are formed into a united case body. Also, in this embodiment, air chamber 43 is disposed on the right side in the vehicle width direction, and thereby a space is obtained on the left side. Battery 50 is disposed in this obtained space on the left side. Other parts of construction are similar to the first embodiment. Noise of CVT 17 is effectively prevented with this embodiment also.

Eighth Embodiment

Figure 15:
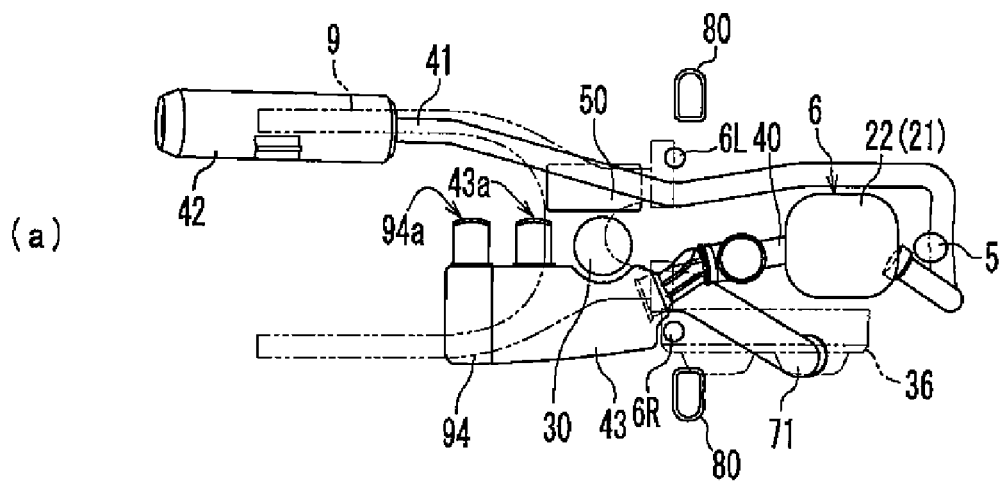
FIG. 15(a) is a plan view and FIG. 15(b) is a right side view of a part of a motorcycle according to an eighth embodiment of the invention.
Figure 15:
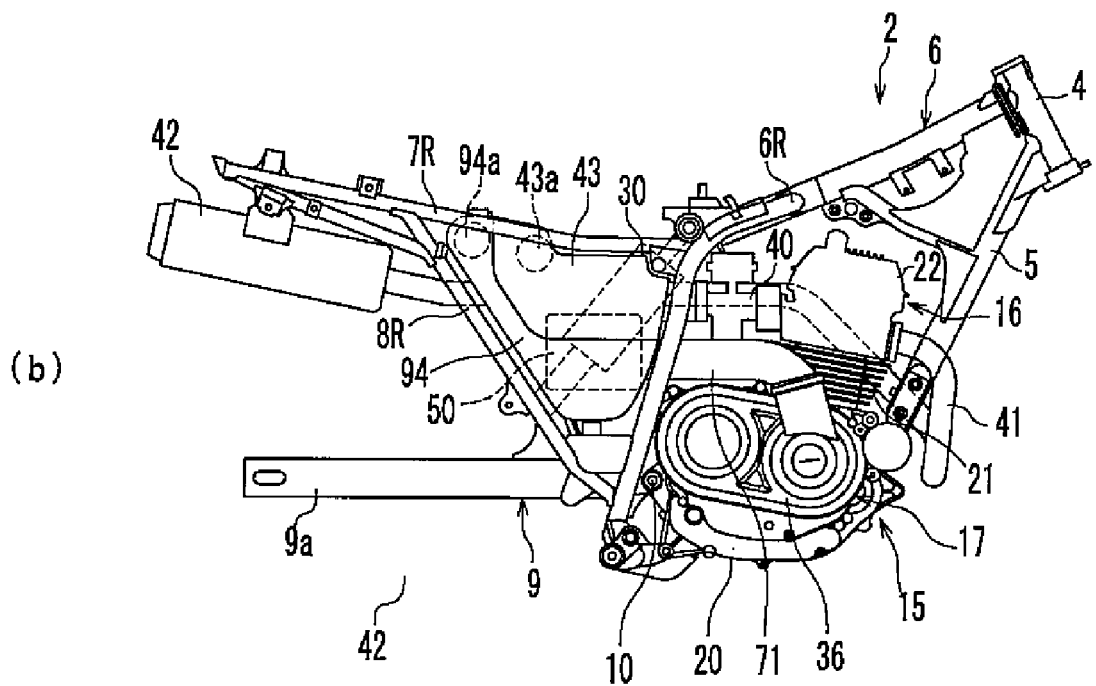

As shown in FIGS. 15(a) and (b), in this embodiment, exhaust pipe 41 and muffler 42, disposed below transmission casing 36 in the seventh embodiment, are disposed above battery 50. With such a mode, similar to the above embodiments, the air passage for inducting air into belt chamber 38 can be formed long. Noise of CVT 17 is effectively prevented with this embodiment also.

In the above embodiments, the air passage according to the present invention is an intake passage for inducting air into belt chamber 38 comprising intake duct 71 and air chamber 94. However, an air passage according to the present invention is not limited to this intake passage. The air passage may be, for example, an exhaust passage for discharging air from belt chamber 38, in which duct 71 used as an intake duct in the above embodiments is used as an exhaust duct for discharging cooling air inducted into belt chamber 38. In this case, a duct for an intake purpose or an intake opening can be separately provided for transmission casing 36.

In the above embodiments, a sound absorption material disposed inside transmission casing 36 has not been described. However, a sound absorption material may be disposed inside transmission casing 36 in the above embodiments for further reduction of noise.

As described herein, the present invention is valuable for a motorcycle including a belt type continuously variable transmission having a resin block belt.

The invention claimed is:

1. A motorcycle comprising:
   an engine unit including a transmission casing in which a belt chamber is provided, and a belt driven continuously variable transmission housed in the belt chamber and including a resin block belt;
   a frame member disposed more rearward than or above the transmission casing, extending in a vertical direction or obliquely upward and downward directions, and supporting at least a portion of the engine unit;
   an air passage connected to the transmission casing, and provided with an intake passage arranged to induct air into the belt chamber or an exhaust passage arranged to discharge air from the belt chamber; wherein
   the air passage extends rearward from the transmission casing and passes over the frame member in a side view of the motorcycle, and includes a curved portion arranged to curve around the frame member.

2. The motorcycle according to claim 1, wherein the belt driven continuously variable transmission includes a primary sheave and a secondary sheave positioned more rearward than the primary sheave, and
   the air passage is connected to a portion of the transmission unit case more forward than a rear end of the primary sheave.

3. The motorcycle according to claim 1, further comprising a pair of right and left frame members, wherein the air passage passes through a space between the right and left frame members.

4. The motorcycle according to claim 3, further comprising a foot rest positioned outside in a vehicle width direction of the right and left frame members in a plan view of the motorcycle.

5. The motorcycle according to claim 1, wherein the air passage includes an intake passage arranged to induct air into the belt chamber.

6. The motorcycle according to claim 5, further comprising:
   a body frame including the frame member;
   a rear wheel;
   a rear arm supporting the rear wheel; and
   a pivot shaft swingably supporting the rear arm on the body frame, wherein
   the intake passage includes an intake opening positioned above the pivot shaft.

7. The motorcycle according to claim 6, further comprising a seat, wherein the intake opening is positioned below the seat.

8. The motorcycle according to claim 6, further comprising a rear cushion unit provided at a center in the vehicle width direction and including a first end swingably connected to the body frame and a second end swingably connected to the rear arm, wherein the air passage passes through a space between the rear cushion unit and the frame member in a plan view of the motorcycle.

9. The motorcycle according to claim 1, wherein the engine includes a cylinder, and
   the air passage passes through a space between the cylinder and the frame member in a plan view of the motorcycle.

10. The motorcycle according to claim 1, wherein the transmission casing is disposed on either a right or a left side in a vehicle width direction, and a rear end of the air passage is disposed on the side opposite to the transmission casing in the vehicle width direction, in a plan view of the motorcycle.

11. The motorcycle according to claim 1, wherein the air passage extends substantially horizontally at a location where the curved portion passes over the frame member in the side view of the motorcycle.

12. The motorcycle according to claim 1, wherein the air passage curves inward in a vehicle width direction at a location where the curved portion passes over the frame member in the side view of the motorcycle.

13. The motorcycle according to claim 1, further comprising a left seat rail and a right seat rail arranged to support a seat of the motorcycle, wherein the frame member is a seat pillar connected to a forward end of the left seat rail or the right seat rail.

14. A motorcycle comprising:
   an engine unit including a transmission casing in which a belt chamber is provided, and a belt driven continuously variable transmission housed in the belt chamber and including a resin block belt;
   a frame member disposed more rearward than or above the transmission casing, extending in a vertical direction or obliquely upward and downward directions, and supporting at least a portion of the engine unit;
   an air passage connected to the transmission casing, and provided with an intake passage arranged to induct air into the belt chamber or an exhaust passage arranged to discharge air from the belt chamber; wherein
   the air passage extends rearward from the transmission casing and passes over the frame member in a side view of the motorcycle, and includes a curved portion arranged to curve around the frame member;
   at least a portion of the air passage is positioned outside an inner end of the frame member in a vehicle width direction in a plan view of the motorcycle; and
   the curved portion is positioned inside the inner end of the frame member in the vehicle width direction in the plan view of the motorcycle.

* * * * *